United States Patent

Jurgenson et al.

[11] Patent Number: 6,072,151
[45] Date of Patent: Jun. 6, 2000

[54] METHOD FOR ADJUSTING HEAD SUSPENSION LOAD

[75] Inventors: Ryan A. Jurgenson, Hutchinson; Reid C. Danielson, Cokato; Brent D. Lien, Minneapolis; Mark S. Lewandowski, Hutchinson, all of Minn.

[73] Assignee: Hutchinson Technology Incorporated, Hutchinson, Minn.

[21] Appl. No.: 09/220,213

[22] Filed: Dec. 23, 1998

Related U.S. Application Data

[62] Division of application No. 08/898,883, Jun. 27, 1997, Pat. No. 5,995,335, which is a continuation of application No. 08/558,446, Nov. 16, 1995, abandoned.

[51] Int. Cl.$^7$ .................................................. B23K 26/00
[52] U.S. Cl. .............................. 219/121.85; 219/121.72
[58] Field of Search ......................................... 360/103, 104, 360/105, 106; 29/603.03; 219/121.67, 121.72, 121.85; 72/342.1

[56] References Cited

U.S. PATENT DOCUMENTS

| | | |
|---|---|---|
| 4,603,567 | 8/1986 | Smitin et al. . |
| 4,723,186 | 2/1988 | Nakajima et al. ................... 360/104 |
| 4,949,194 | 8/1990 | MacPherson et al. . |
| 5,126,904 | 6/1992 | Sakurai . |
| 5,198,945 | 3/1993 | Blaeser et al. . |
| 5,201,458 | 4/1993 | Hagen ................................. 219/121.64 |
| 5,256,850 | 10/1993 | Maegawa et al. . |
| 5,268,805 | 12/1993 | Peng et al. . |
| 5,297,413 | 3/1994 | Schones et al. . |
| 5,299,081 | 3/1994 | Hatch et al. . |
| 5,347,415 | 9/1994 | Murata et al. . |
| 5,461,525 | 10/1995 | Christianson et al. . |
| 5,521,778 | 5/1996 | Boutaghou et al. . |
| 5,588,200 | 12/1996 | Schudel ................................. 360/109 |
| 5,712,463 | 1/1998 | Singh et al. ........................ 219/121.85 |

FOREIGN PATENT DOCUMENTS

| | | |
|---|---|---|
| 632435 | 1/1995 | European Pat. Off. ............... 360/103 |
| 60/187977 | 9/1985 | Japan ..................................... 360/104 |
| 62-75988 | 4/1987 | Japan . |
| 63-212082 | 9/1988 | Japan . |

OTHER PUBLICATIONS

United States Invention Registration #H1573, Aug. 6, 1996, Budde, Reduced Mass/Inertin Suspension.

*Primary Examiner*—Geoffrey S. Evans
*Attorney, Agent, or Firm*—Faegre & Benson LLP

[57] ABSTRACT

A method for adjusting the load of a head suspension for supporting a read/write head over a disk in a magnetic disk drive. The suspension includes a load beam having a rigid region and proximal and distal ends, with a base on the proximal end and a flexure on the distal end. A spring region is located between the base and rigid region of the load beam. The spring region includes a pair of arms which extend between the base and rigid region to form a cutout, and a plurality of load adjustment frets which extend across the cutout between the base and rigid region. One or more of the frets can be severed by a laser beam to lower the gram load of the suspension. The gram load of the suspension can be increased by shrinking the frets through exposure to the laser beam. Gram load adjustments can be made with the suspensions in a disk stack assembly by directing the laser beam to the frets through an optical fiber.

29 Claims, 3 Drawing Sheets

METHOD FOR ADJUSTING HEAD SUSPENSION LOAD

REFERENCE TO RELATED APPLICATION

This is a divisional application of pending U.S. patent application Ser. No. 08/898,883, filed Jun. 27, 1997, now U.S. Pat. No. 5,995,335, and entitled "In-Stack Adjustable Magnetic Head Suspension," which is a continuation of U.S. patent application Ser. No. 08/558,446, filed Nov. 16, 1995, now abandoned, the entire disclosure of which is hereby incorporated by reference in its entirety for all purposes.

BACKGROUND OF THE INVENTION

1. Field of the Invention

The present invention relates to a method for adjusting the gram load of the suspension.

2. Background of the Invention

Head suspensions are commonly used in magnetic disk drives to support the magnetic read/write heads in close proximity to the rotating magnetic disks. The well known and widely used Watrous-type suspensions such as that disclosed in the Blaeser et al. U.S. Pat. No. 5,198,945 include a load beam having a mounting region or base plate at a proximal end, a flexure on a distal end, a relatively rigid region adjacent to the flexure and a spring region between the base plate and rigid region. An air-bearing, slider which includes the magnetic head is mounted to the flexure. The load beam and flexure are typically manufactured by etching and forming a thin stainless steel sheet. The slider is then adhesively bonded to the flexure.

During operation of the disk drive, typically the slider does not touch the rotating disk. Rather, the force of the air rotating with the disk causes the slider to fly at a microscopic distance known as the "fly height" above the disk. The suspension urges the slider toward the disk with a force known as the gram load to counteract the slider-generated air-bearing forces and maintain the proper fly height.

The gram load is established during the suspension manufacturing operation. Techniques for adjusting suspension gram loads are well known and disclosed, for example, in the Schones et al. U.S. Pat. No. 5,297,413. One common gram load adjustment technique involves mechanically bending the suspension at the spring region to increase (i.e., to upgram) or decrease (i.e., to downgram) the gram load. Another technique known as "light adjustment" involves the application of heat to the spring region. Heat relieves mechanical stresses in the spring region and lowers the gram load. During suspension manufacture the gram loads are adjusted to predetermined tolerances to provide the proper fly height. Excessive fly height can impair the ability of the head to read and write data to the disk; insufficient fly height can cause the head to hit the disk and damage the disk or head.

Following the manufacture and gram load adjustment of the suspensions, the sliders are bonded to the flexures, typically in a manual operation, to form head suspension assemblies. The head suspension assemblies are in turn mounted to actuator arms extending from a rotating actuator shaft to form a head stack assembly. The head stack assembly is then mounted with respect to a stack of magnetic disks, with the suspensions extending between the disks.

Instruments and techniques for measuring fly heights are known. The read signal strength produced by magnetorestrictive heads is proportional to the distance between the head and magnetic disk. The fly height of magnetorestrictive heads can therefore be determined as a function of the difference in the signal strength produced by the head while sliding at low speed on the disk and operational flying position. Another method for measuring fly height involves monitoring acoustic emissions (noise levels) produced by the flying head, and correlating the acoustic emission level to fly height.

Disk drive manufacturers continue to develop smaller yet higher storage capacity drives. Storage capacity increases are obtained in part by increasing the density of the information tracks on the magnetic disks (i.e., by using narrower and/or more closely spaced tracks), and by using smaller sliders and heads. These technological advances require lower and more accurate fly heights.

Unfortunately, it is becoming increasingly difficult to obtain the required fly height tolerances using known suspensions and manufacturing procedures. Suspension gram load variations account for a significant portion of fly height variations, and are the result of a number of factors. As mentioned above, suspension gram loads will vary within manufacturing tolerances. Another factor is the stacking tolerances in the disk drive assembly. Head suspension assemblies are delicate components, and the physical handling of these components during the head bonding and drive assembly procedures can also alter the suspension gram loads. Furthermore, since the disks are tightly spaced and the suspensions extend between the disks, it is difficult to readjust the suspension gram loads and therefore the fly heights following the manufacture of the disk drive assembly.

There is, therefore, a continuing need for suspensions capable of being efficiently and accurately gram load adjusted. To be commercially viable, the suspensions must be relatively efficient to manufacture. A suspension that can be gram load adjusted in a head stack assembly, and methods for performing such gram load adjustments, would be particularly desirable.

SUMMARY OF THE INVENTION

The present invention is a method for increasing or decreasing the gram load of a head suspension having one or more load adjustments frets. In one embodiment, the present invention is directed to a method for increasing the load of the suspension that includes applying heat to a center fret and/or frets symmetrically positioned about the center fret to shrink the frets. In a second embodiment, the present invention is directed to a method for decreasing the load of the suspension that includes severing one or more frets. Alternatively, the load can be decreased by applying heat to one or more spring arms of the suspension to stress relieve the arms.

DETAILED DESCRIPTION OF THE PREFERRED EMBODIMENTS

Figure 1:
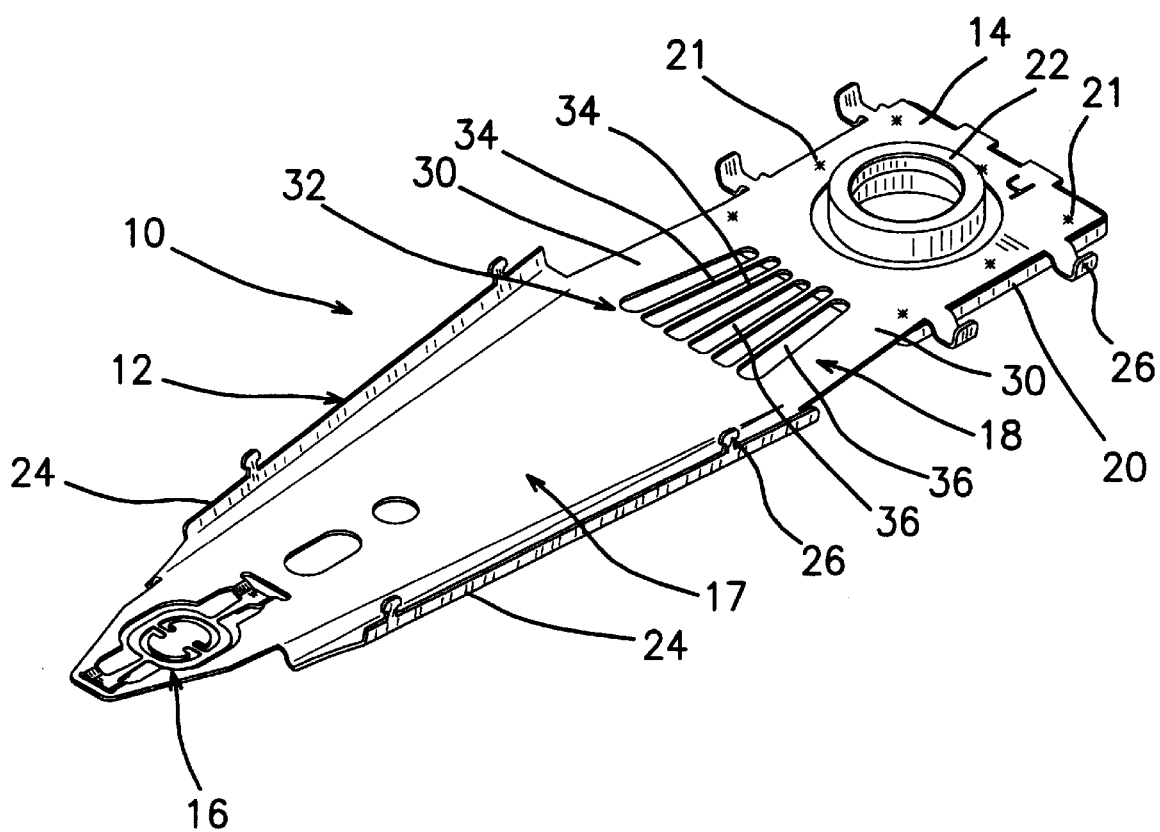
FIG. 1 is an isometric view of a head suspension in accordance with the present invention.

A magnetic read/write head suspension 10 which can be adjusted in accordance with the present invention is illustrated generally in FIG. 1. As shown, suspension 10 includes a load beam 12 having a mounting region or base 14 on a proximal end, a flexure 16 on a distal end, a relatively rigid region 17 adjacent to the flexure, and a radius or spring region 18 between the base and rigid region. With the exception of spring region 18 which is described in greater detail below, suspension 10 can be of any known or conventional design. The illustrated suspension 10 (with the exception of spring region 18) is, for example, a Type 1650 suspension which is commercially available from Hutchinson Technology Incorporated of Hutchinson, Minn. This suspension 10 includes a base plate 20 welded to base 14 at points 21, and swage boss 22 for mounting the suspension to a disk drive actuator arm (not shown in FIG. 1). Flexure 16 is an integral gimbal-type flexure, etched and formed from the same thin and unitary sheet of stainless steel from which the other elements of the load beam 12 are fabricated. Although not shown in FIG. 1, a slider with a magnetic read/write head will be bonded to flexure 16 to form a head gimbal assembly from suspension 10. A pair of channel rails 24 are formed in the opposite sides of the load beam 12 along the length of the rigid region 17. Tabs 26 which extend from rails 24 and base 14 are used to position and support lead wires (not shown) which extend from the read/write head.

Spring region 18 includes a pair of primary spring arms 30 which extend between base 14 and rigid region 17 on the outer edges of load beam 12. A cutout area 32 is formed between spring arms 30. A plurality of load adjustment frets 34 extend across the cutout area 32 between the base 14 and rigid region 17, and divide the cutout area into slots 36. Frets 34 are elongated members, and relatively narrow in width with respect to the width of the arms 30. The embodiment shown includes five (i.e., an odd number) of generally equally-sized frets 34, with one fret extending along a central longitudinal axis of the suspension, and two evenly-spaced frets on each side of the central fret. Slots 36 in the illustrated embodiment also have a width which is greater than the width of the frets 34, but less than the width of the arms 30. Frets 34 can be formed during the fabrication of suspension 10 through the use of conventional etching techniques to etch slots 36.

Figure 2:
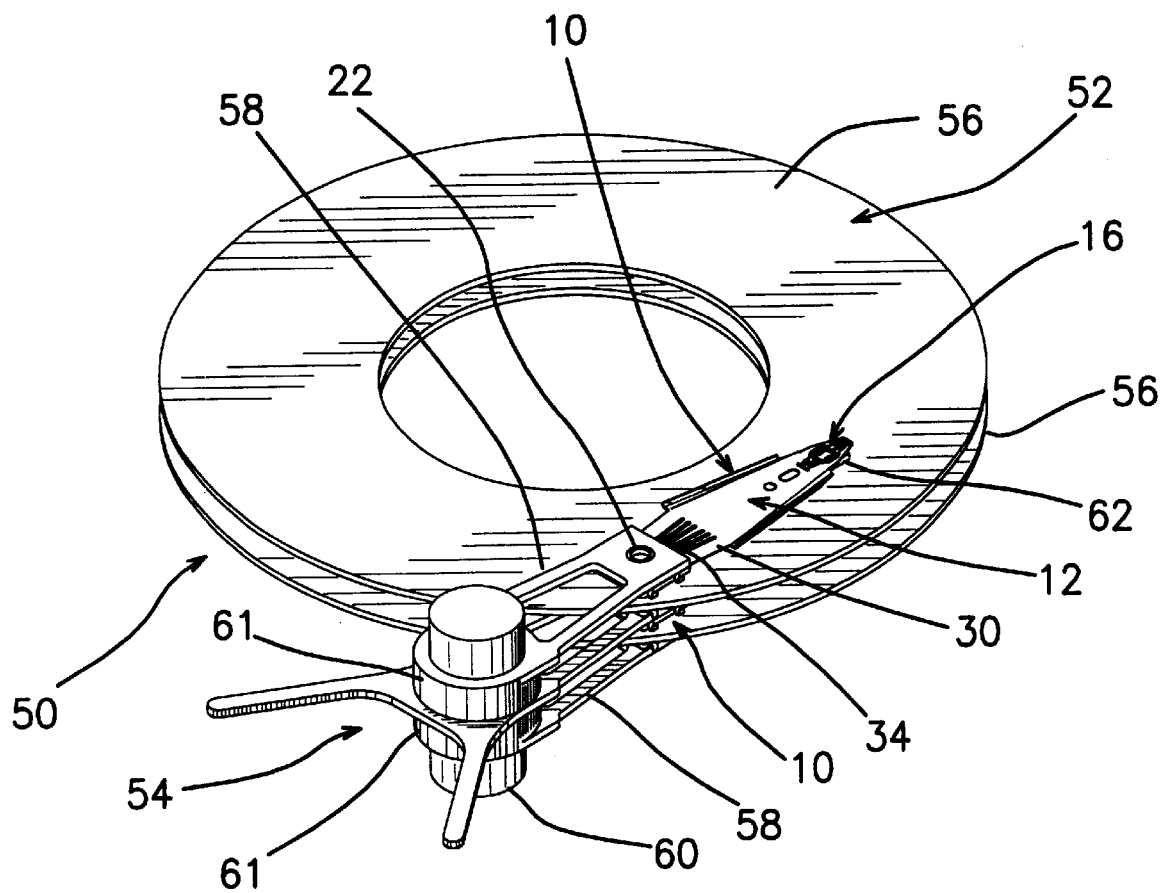
FIG. 2 is an illustration of a partial disk drive assembly including suspensions of the type shown in FIG. 1.

FIG. 2 is an illustration of a disk drive assembly 50 including a magnetic disk stack 52 and a head stack assembly 54 with head suspensions 10 in accordance with the present invention. Disk stack 52 includes one or more spaced disks 56 (two are shown in FIG. 2) mounted to a spindle (not shown in FIG. 2) for rotation by a drive motor (also not shown). Head stack assembly 54 includes a plurality of actuator arms 58 having proximal ends mounted to actuator shaft 60. The bases of suspensions 10 are mounted to the distal ends of actuator arms 58 in a conventional manner by means of swage boss 22. A slider 62 with a magnetic read/write head (not visible) is mounted to the flexure 16 of each suspension 10 (the slider on only the uppermost suspension is visible in FIG. 2). The actuator arms 58 are spaced from one another by spacers 61 in such a manner that the suspensions 10 mounted thereto extend between disks 56 to position the sliders 62 and magnetic heads adjacent to the disk surfaces.

Figure 3:
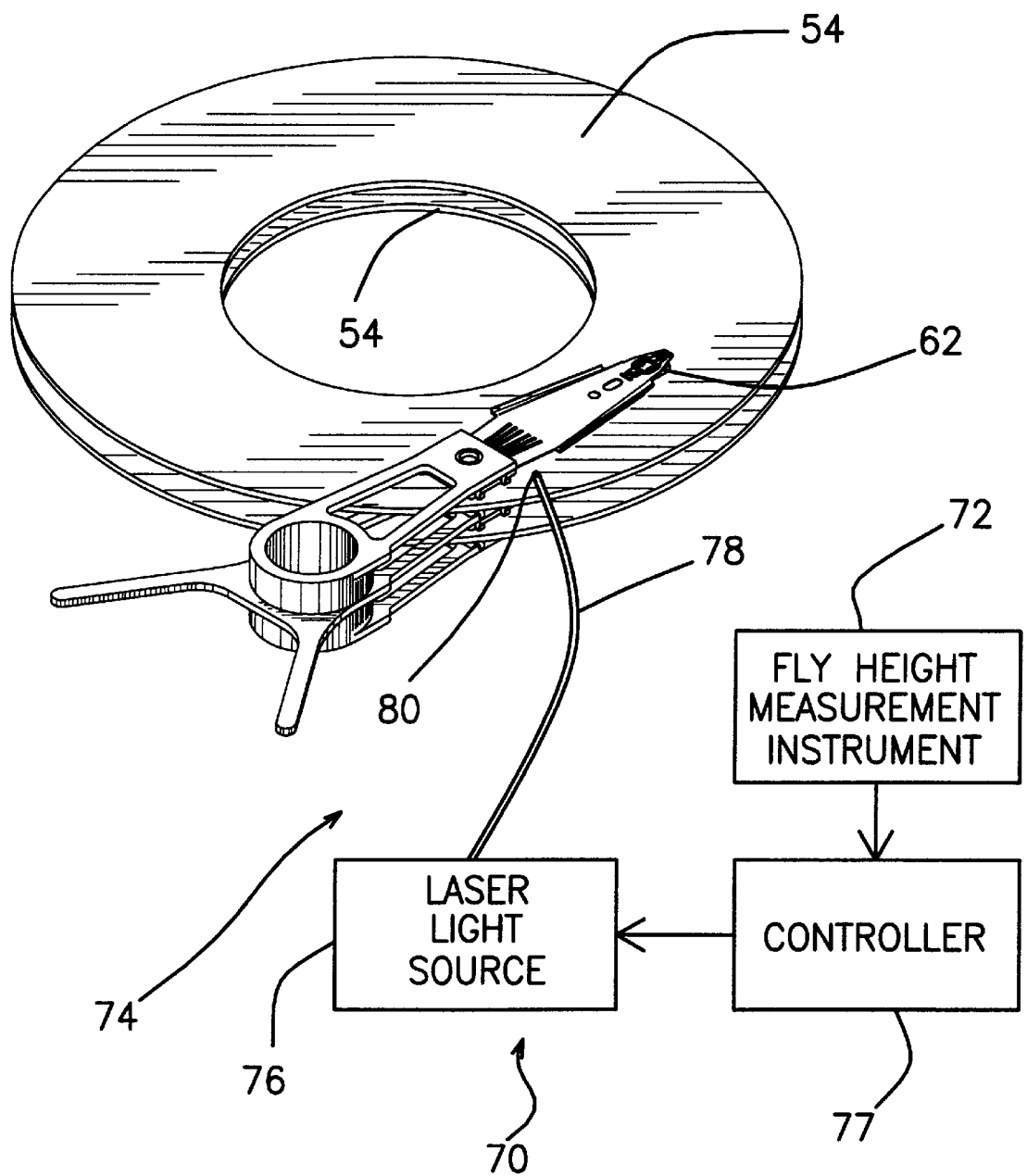
FIG. 3 is an illustration of a system which can be used to adjust the gram load and fly height of the suspensions in the disk drive assembly shown in FIG. 2.

The gram load of suspensions 10 in disk drive assembly 50, and therefore the fly height of the sliders 62 with respect to the disks 54, can be adjusted by exposing frets 34 and/or arms 30 to heat or other radiant energy. FIG. 3 is an illustration of a load adjustment system 70 which can be used to perform gram load adjustments on suspensions 10 of drive assembly 50 (i.e., "in-stack"). System 70 can also be used to gram load adjust suspensions 10 during their manufacture. As shown, system 70 includes fly height measurement instrument 72, laser system 74 and microprocessor-based controller 77. Fly height measurement instrument 72 can be any commercially available or otherwise known instrument from which the desired fly height of the head slider can be measured or otherwise inferred or determined. Laser system 74 includes a commercially available laser light source 76 and optical fiber 78. Laser light generated by source 76 is directed through optical fiber 78 and emerges from the tip 80 on the free end of the fiber. As described in greater detail below, controller 77 is programmed to control light source 76 in such a manner as to achieve desired gram load changes. A ten watt continuous wave (CW) laser diode light source 76 (e.g., SDL—8110 Series from SDL of San Jose, Calif.) coupled to an optical fiber 78 having a side-firing tip 80 (e.g., from SDL or 3M of St. Paul, Minn.) were used during tests of the suspension 10 and gram load adjustment procedure described herein. Although not shown in FIG. 3, a laser targeting system can also be included to accurately position the tip 80 of fiber 78 adjacent to the portion of suspension 10 to be exposed to radiant energy.

To enable accurate in-stack gram load adjustments of the suspensions 10 which are located between the disks 54 of disk drive assembly 50, optical fiber 78, or at least the portion of the optical fiber adjacent to tip 80, should have a diameter which is less than the spacing between the suspensions and the disks. Fiber 78 can then be inserted between the disks 54 and the tip 80 precisely positioned adjacent to the fret 34 or arm 30 to which the laser light is to be applied. Although not shown in FIG. 3, adjustment system 70 can include a fixture for positioning the tip 80 of fiber 78 with respect to suspensions 10 of disk drive assembly 50. Enlarged "target" areas can also be included on the frets 34 (not shown) to increase the accuracy and efficiency by which the frets are exposed to the laser light.

Load adjustment system 70 can be used to both upgram suspensions 10 (i.e., to increase the gram load and decrease the fly height), and to downgram the suspensions (i.e., to decrease the gram load and increase the fly height). As described in greater detail below, these gram load adjustments can be made by varying internal stress characteristics of the suspension 10 through the application of heat. The stresses and temperatures to which the suspension 10 are exposed before the load adjustment procedures (stress and temperature histories) should therefore be optimized to maximize the range of gram load adjustments that can be made.

To downgram a suspension 10, one but preferably both of the arms 30 can be exposed to the laser light to stress relieve the arms. It is preferable to symmetrically stress relieve both arms 30 to minimize the buildup of any static offsets in the suspension 10. This stress relief procedure can also be performed while the suspension 10 is in a loaded condition corresponding to the operating condition of the suspension. Controller 77 is programmed with arm downgram light adjust data characterizing the relationship between the amount of radiant energy applied to arms 30 and associated changes in the fly height or gram load of the suspension 10. This energy/gram load relationship will depend on factors such as the mass, stress (e.g., bending) history, temperature history, size, aid shape of the arms 30, and can be empirically determined.

The amount of energy applied to the arms 30 can be controlled by varying the intensity of the laser light impinged upon the arms and/or the length of time to which the arms are exposed to the light. In one embodiment, controller 77 causes light source 76 to provide a fixed intensity output, and is programmed with arm downgram light adjust data characterizing expected gram load decreases as a function of the exposure period. Stress relief characteristics of this type are typically observed in stainless steel at temperatures between about 300°–525° F. (150–275° C.). The energy should be applied in a manner which avoids burning or browning (i.e., discoloration due to oxidation) of the suspension 10.

Suspensions 10 can also be downgrammed by cutting or severing one or more frets 34. The frets 34 can be cut in a symmetrical manner with respect to the central longitudinal axis of suspension 10 to minimize the buildup of static offsets in the suspension. For example, if an odd number of frets 34 are to be severed to downgram suspension 10, one of the severed frets should be the center fret. Whenever frets 34 are to be severed in pairs, frets which are evenly spaced with respect to the center fret should be severed. Radiant energy from load adjustment system 70 can be used to sever frets 34 while the suspensions 10 are mounted in disk drive assembly 50. Laser system 74 can be operated under visual control to sever frets 34. Alternatively, controller 77 can be programmed with fret severing data characterizing the amount of energy required to sever the frets 34. Relatively large amounts of energy per unit area are applied for a relatively short period of lime (typically less than one millisecond) to vaporize and destroy a portion of a fret 34. The amount of energy needed to sever frets 34 will depend on factors such as the mass, size and shape of the frets, and can be empirically determined. Alternatively, the frets 34 can be mechanically cut if the suspensions 10 are not within assembly 50 or if sufficient clearance is available to access the frets with other types of cutting tools.

To upgram a suspension 10, one of more frets 34 can be shrunk through exposure to radiant energy by system 70. It is preferable to symmetrically shrink frets 34 with respect to the central longitudinal axis of the suspension 10 to minimize the buildup of static offsets in the suspension. For example, if an odd number of frets 34 are to be subjected to heat shrinkage to upgram suspension 10, one of the shrunk frets should be the center fret. Whenever pairs of frets 34 are to be subjected to heat shrinkage, frets which are evenly spaced with respect to the center fret should be shrunk. Controller 77 is programmed with fret upgram light adjust data characterizing the relationship between the amount of energy applied to frets 34 and the associated changes in the fly height or gram load of the suspension 10. This energy/gram load relationship will depend on factors such as the mass, stress history, temperature history, size, and shape of frets 34, and can be empirically determined.

The amount of energy applied to the frets 34 can be controlled by varying the intensity of the laser light impinged upon the frets and/or the length of time to which the frets are exposed to the light. In one embodiment, controller 77 causes light source 76 to provide a fixed intensity output, and is programmed with fret upgram light adjust data characterizing expected gram load increases as a function of the exposure period. Heat shrinkage characteristics of this type are typically observed in stainless steel at temperatures near 1200° F. (650° C.), with phase transitions between martensite and austenite occurring at about 1200° F. Although some discoloration can occur at these temperatures, the energy should be applied in a manner which minimizes burning or browning of the suspension 10.

The size, shape and mass of frets 34 and arms 30, and the number of frets, can be selected to optimize the characteristics of suspension 10 for its intended applications. The greater the number of frets 34 in the suspension 10, for example, the higher the degree of accuracy (i.e., resolution) that can be obtained during load adjustments since each fret will carry a relatively smaller portion of the overall gram load for which the suspension is designed. Arms 30 can also be sized larger than frets 34 to carry a relatively large portion of the gram load for which the suspension 10 is designed, with the number and size of frets 34 configured to provide the necessary range and resolution of gram load adjustability. Each fret 34 can be sized to carry a predetermined gram load such as about 0.2 grams in their integral or uncut state. Although frets 34 are equally sized in the embodiment of suspension 10 shown in FIG. 1, the frets can be differently sized to carry a nonlinear scaled range of loads (e.g., a logarithmic load distribution) to a enable a wide range of load adjustments.

The overall operation of gram load adjustment system 70 can be controlled by controller 77. In addition to the gram load adjustment data described above, controller 77 is also programmed with data characterizing the desired fly heights or gram loads of suspensions 10, a specification range of acceptable gram loads for the suspensions, and a fly height or gram load adjustment algorithm. Controller 77 begins the execution of the load adjustment algorithm after a disk drive assembly 50 is interfaced to system 70. Once the disks 80 are rotating at their normal operating speed, controller 77 causes instrument 72 to measure the then-current actual fly height of a suspension 10 and its slider 62 with respect to the associated disk. The measured actual fly height is then compared to the desired fly height specification range. If the measured fly height is within the specification range, no adjustments are necessary and the fly height of another suspension 10 is measured. If the measured fly height is outside of the specification range, an arm downgram light adjust procedure, fret upgram light adjust procedure or fret severing procedure is performed on one or more arms 30 and/or frets 34 in an attempt to adjust the fly height to the desired value. After a gram load adjustment the fly height is again measured to determine whether it is within the specification range, and the procedure described above repeated if the fly height is outside the specification range. These procedures are then repeated for each suspension 10 in disk drive assembly 10 until all the actual fly heights of all the suspensions are within the specification range.

Suspensions 10 and the associated gram load adjustment procedures offer considerable advantages. The gram load and therefore the fly height of the suspensions can be efficiently and accurately adjusted. These adjustments can also be made with the suspensions in a disk stack assembly, thereby compensating for manufacturing tolerance variations, stacking tolerances and assembly-induced variations in the gram load of the suspensions. The ability to manufacture disk drive assemblies such as 50 with precision fly-height tolerances enables increased data storage capacities for the associated drives. Fly height adjustments made by this procedure are also stable and repeatable.

Although the present invention has been described with reference to preferred embodiments, those skilled in the art will recognize that changes can be made in form and detail without departing from the spirit and scope of the invention.

What is claimed:

1. A method for adjusting the fly height characteristics of a magnetic head in a magnetic disk drive assembly that includes a disk mounted for rotation and a head suspension assembly for supporting the magnetic head over the magnetic disk, the head suspension including a spring region that provides a predetermined gram load and that has a cutout with one or more load adjustment frets extending across the cutout, each of the load adjustment frets carrying a portion of the predetermined gram load, the method comprising the steps of:

rotating the magnetic disk;

measuring the fly height of the magnetic head of the suspension assembly; and adjusting the fly height characteristics of the magnetic head by varying the internal stress of one or more of the load adjustment frets.

2. The method of claim 1, wherein the step of varying the internal stress of the frets includes applying heat to one or more of the frets to alter the gram load of the suspension assembly.

3. The method of claim 2, wherein the step of applying heat to one or more of the frets includes shrinking the one or more frets to increase the gram load of the suspension assembly.

4. The method of claim 2, wherein the suspension assembly includes an odd number of load adjustment frets symmetrically positioned with respect to a central longitudinal axis of the suspension assembly, and wherein the step of applying heat to one or more of the frets includes applying heat to one of a center fret and a plurality of frets symmetrically positioned with respect to the center fret.

5. The method of claim 1, wherein the step of varying the internal stress of the frets includes severing one or more of the frets to decrease the gram load of the suspension assembly.

6. The method of claim 5, wherein the step of severing one or more of the frets includes applying heat to one or more of the frets.

7. The method of claim 5, wherein the suspension assembly includes an odd number of load adjustment frets symmetrically positioned with respect to a central longitudinal axis of the suspension assembly, and wherein the step of severing one or more of the frets includes severing one of a center fret and a plurality of frets symmetrically positioned with respect to the center fret.

8. The method of claim 1, wherein the cutout defines a pair of spring arms in the spring region of the head suspension, each of the spring arms carrying a portion of the predetermined gram load, and further including the step of varying the internal stress of one of the pair of arms by applying heat the arm to stress relieve the arm and to decrease the gram load of the suspension.

9. A method for adjusting the gram load of a head suspension for supporting a read/write head over a recording medium, comprising the steps of:

providing a head suspension comprising a load beam having a rigid region and proximal and distal ends, a mounting region on the proximal end of the load beam, a flexure on the distal end of the load beam, and a spring region between the mounting region and the rigid region of the load beam for providing a predetermined gram load to the rigid region and the flexure relative to the mounting region and in a direction generally perpendicular to the recording medium, the spring region including a cutout and one or more load adjustment frets extending across the cutout between the mounting region and the rigid region of the load beam, each of the load adjustment frets carrying a portion of the predetermined gram load; and adjusting the internal stress of one or more of the load adjustment frets to increase or decrease the predetermined gram load of the head suspension to adjust the fly height of a read/write head or to account for tolerances/misalignments.

10. The method of claim 9, wherein the step of adjusting the internal stress of one or more of the load adjustment frets includes applying heat to one or more of the frets to shrink the frets to increase the gram load of the suspension.

11. The method of claim 10, wherein the suspension includes an odd number of load adjustment frets extending across the cutout and symmetrically positioned with respect to a central longitudinal axis of the load beam, and wherein heat is applied to one of a center fret and a plurality of frets symmetrically positioned with respect to the center fret to shrink the frets.

12. The method of claim 9, wherein the step of adjusting the internal stress of one or more of the load adjustment frets includes severing one or more of the frets to decrease the gram load of the suspension.

13. The method of claim 12 wherein the step of severing one or more of the frets includes applying heat to the frets.

14. The method of claim 12, wherein the suspension includes an odd number of load adjustment frets extending across the cutout and symmetrically positioned with respect to a central longitudinal axis of the load beam, and wherein the step of severing one or more frets includes severing one of a center fret and a plurality of frets symmetrically positioned with respect to the center fret.

15. The method of claim 9, wherein the cutout defines a pair of spring arms in the spring region of the head suspension, each of the spring arms carrying a portion of the predetermined gram load, and further including the step of varying the internal stress of one of the pair of arms by applying heat the arm to stress relieve the arm and to decrease the gram load of the suspension.

16. A method for adjusting the gram loads of head suspension assemblies in a magnetic disk drive assembly, comprising the steps of:

providing a magnetic disk drive assembly having at least one magnetic disk mounted in a spaced relationship for rotation and a head stack assembly including a plurality of actuator arms and a plurality of head suspension assemblies extending from the plurality of actuator arms, each head suspension assembly including a load beam having a mounting region mounted to one of the plurality of actuator arms, a rigid region and a flexure on an end opposite the mounting region, a magnetic head mounted to the flexure for reading and writing data on the at least one magnetic disk, and a spring region between the mounting region and the rigid region of the load beam for applying a predetermined gram load to the magnetic head in a direction generally perpendicular to the at least one magnetic disk, the spring region including a cutout and one or more load adjustment frets extending across the cutout between the mounting region and the rigid region of the load beam, each of the load adjustment frets carrying a portion of the predetermined gram load;

rotating the at least one magnetic disk;

measuring the fly height of the magnetic head of at least one of the suspension assemblies; and processing the one or more load adjustment frets to adjust the suspension assembly load if the fly height is outside a predetermined tolerance range.

17. The method of claim 16, wherein the step of adjusting the suspension assembly load includes varying the internal stress of one or more of the load adjustment frets.

18. The method of claim 17 wherein the step of varying the internal stress of one or more of the load adjustment frets includes applying heat to one or more of the load adjustment frets to shrink the frets to increase the load of the suspension assembly.

19. The method of claim 18 wherein the step of applying heat to one or more of the frets includes directing light to the frets through an optical fiber.

20. The method of claim 19 wherein the magnetic disk drive assembly includes two adjacent magnetic disks and wherein the step of directing light through an optical fiber includes extending the optical fiber between the two adjacent magnetic disks.

21. The method of claim 19 wherein the step of directing light to the frets through an optical fiber includes directing light to the frets through a side-firing optical fiber.

22. The method of claim 17 wherein the step of varying the internal stress of one or more of the load adjustment frets includes applying heat to one or more of the frets to sever the frets to decrease the load of the suspension assembly.

23. The method of claim 22 wherein the step of applying heat to one or more of the frets includes directing light to the frets through an optical fiber.

24. The method of claim 23 wherein the magnetic disk drive assembly includes two adjacent magnetic disks and wherein the step of directing light through an optical fiber includes extending the optical fiber between two adjacent disks.

25. The method of claim 24 wherein the step of directing light to the frets through an optical fiber includes directing light to the frets through a side-firing optical fiber.

26. The method of claim 16 wherein the cutout defines a pair of spring arms in the spring region of the suspension assembly, each of the spring arms carrying a portion of the predetermined gram load, and further including the step of varying the internal stress of at least one of the pair of arms by applying heat to at least one of the pair of arms to stress relieve the arm to decrease the gram load of the suspension assembly.

27. The method of claim 26 wherein the step of applying heat to the arm includes directing light to the arms through an optical fiber.

28. The method of claim 27 wherein the disk drive includes two adjacent magnetic disks and wherein the step of directing light through an optical fiber includes extending the optical fiber between two adjacent disks.

29. The method of claim 28 wherein the step of directing light through an optical fiber includes directing light through a side-firing optical fiber.

* * * * *